(12) United States Patent
Steffens et al.

(10) Patent No.: US 6,379,819 B1
(45) Date of Patent: Apr. 30, 2002

(54) SLIDING BEARING MATERIAL

(75) Inventors: Thomas Steffens, Bad-Rappenau; Werner Schubert, Wiesloch, both of (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 09/530,517

(22) PCT Filed: Nov. 9, 1998

(86) PCT No.: PCT/EP98/07123

§ 371 Date: Jul. 17, 2000

§ 102(e) Date: Jul. 17, 2000

(87) PCT Pub. No.: WO99/24629

PCT Pub. Date: May 20, 1999

(30) Foreign Application Priority Data

Nov. 12, 1997 (DE) .......................... 197 50 080

(51) Int. Cl.⁷ .......................... F16C 33/12; B32B 15/20
(52) U.S. Cl. .................. 428/653; 428/650; 384/912; 420/530; 420/538
(58) Field of Search .............................. 428/653, 652, 428/654, 650; 384/912; 420/530, 538

(56) References Cited

U.S. PATENT DOCUMENTS

| | | | | |
|---|---|---|---|---|
| 2,616,771 A | * | 11/1952 | Metzgar | 384/912 |
| 3,093,885 A | * | 6/1963 | Morrison et al. | 384/912 |
| 4,973,523 A | * | 11/1990 | Neuhaus et al. | 428/653 |
| 5,162,100 A | * | 11/1992 | Tanaka et al. | 420/530 |
| 5,226,953 A | * | 7/1993 | Hodes et al. | 75/693 |
| 5,362,574 A | * | 11/1994 | Tanaka et al. | 428/643 |

FOREIGN PATENT DOCUMENTS

| | | | |
|---|---|---|---|
| DE | 37 27 591 | | 3/1989 |
| DE | 39 38 234 | | 5/1990 |
| DE | 40 04 703 | | 9/1990 |
| DE | 43 12 537 | | 11/1993 |
| GB | 1 073 428 | | 2/1963 |
| GB | 917 986 | | 6/1967 |
| GB | 2252565 A | * | 8/1992 |
| JP | 56-102543 | * | 8/1981 |

OTHER PUBLICATIONS

Chemical Abstracts, vol. 89, No. 14, Oct. 2, 1978 Columbus, Ohio, US; abstract No. 116160, De Gee, A.W.J.: "Aluminum–based bearing metals" XP002098463 see abstract & Aluminum (Düsseldorf) (1978), 54(4), 261–5 Coden: Alumab; ISSN: 0002–6689, 1978, No Month.

* cited by examiner

Primary Examiner—John J. Zimmerman
(74) Attorney, Agent, or Firm—Paul Vincent

(57) ABSTRACT

The invention relates to a sliding bearing composite material with a hard metal support layer and a metallic sliding coating which is roll-bonded onto said support layer. The inventive sliding bearing composite is made of an aluminum alloy with tin comprising 10 to 20 percent by mass and with additions of copper and nickel. The sliding layer is in direct contact with the sliding mate. The sliding bearing composite material is thus improved with respect to the loading capacity and plasticity in that the aluminum alloy is comprised of tin, copper, nickel and remaining aluminum, the copper and nickel each have a percentage by mass of 0.2 to 2, and the ratio of percentage by mass of copper to the percentage by mass of nickel is between 0.6 and 1.5.

6 Claims, No Drawings

SLIDING BEARING MATERIAL

This application is a 371 of PCT/EP98/07123 filed Nov. 9, 1998.

BACKGROUND OF THE INVENTION

The invention concerns a composite sliding bearing material, with a hard metal support layer and a metal sliding layer roll-bonded onto the support layer and made from an aluminum alloy with 10 to 25 mass % tin and with copper and nickel additives which is in direct contact with the sliding partner. The sliding layer has no additional, e.g. galvanically applied, sliding layer.

A sliding bearing material of this kind is disclosed e.g. in DE 40 04 703 A1. The single embodiment describes an aluminum alloy with a composition of AlSn10Ni2Mn1Cu0.5, wherein lead can also be added instead of tin. Aluminum alloys of this kind which are used as sliding bearing material require a "soft phase" in the form of a tin or lead precipitate to guarantee good emergency running properties for a bearing produced from this sliding bearing material. Hard contaminating particles or abrasions are accepted by or embedded in this soft phase. The soft phase can also adjust to geometrical conditions. The soft phase of tin, which does not dissolve in aluminum, is received in the matrix-forming aluminum in the form of block-like precipitates.

Copper can be added to increase the stability of the aluminum matrix. Copper and aluminum form inter-metallic phases, so-called hard substance phases such as $Al_2Cu$ and finely distributed precursors thereof which increase the rigidity of the aluminum matrix when present as finely distributed precipitates ($\leq 1\mu m$). This increases the stability under load and fatigue resistance of a sliding bearing material produced from the alloy. An aluminum alloy AlSn15Cu2 of this kind has been disclosed under the trade name KS 985.3 by the assignee. This alloy has excellent tribological properties but is inadequate under extreme loads such as e.g. occur in connecting rod bearings in modern internal combustion engines.

Improvements have been attempted in the aluminum alloy disclosed in DE 40 04 701 A1 by adding manganese and nickel to increase the proportion of hard substance phases, in particular, according to this document, in the region of the tin precipitates to improve bonding of the tin precipitates in the aluminum matrix due to the affinity of tin for nickel and manganese.

A certain proportion of hard substance phases or precipitates is believed to have a positive effect on the wear resistance in that the hard substance phases on the surface effect fine abrasion of the sliding partner, e.g. of the crank shaft, to abrade roughness peaks in the steel sliding partner. The hard substance phases also increase the stability of the bearing material under load.

Increasing the proportion of inter-metallic hard substance phases also causes problems with respect to fatigue resistance and manufacture. Shaping, in particular during cold-plating of the aluminum alloy on steel requiring a pass having approximately 50% shaping, thereby produces cracks.

DE 37 27 591 A1 discloses a multiple layer sliding bearing substance comprising an intermediate layer of AlSn6CuNi between a steel supporting base and a galvanically disposed sliding layer having a thickness between 5 and 50 $\mu m$.

SUMMARY OF THE INVENTION

It is the underlying purpose of the present invention to improve an alloy of the above mentioned kind such that its stability under load is better than that of conventional aluminum-tin-copper or aluminum-tin-copper-nickel-alloys and which has improved plasticity, in particular, plateability.

DESCRIPTION OF THE PREFERRED EMBODIMENT

This object is achieved by a sliding bearing composite material of the above mentioned kind, characterized in that the aluminum alloy of the sliding layer comprises tin, copper, nickel, the balance being aluminum, wherein copper and nickel each have a portion of 0.2 to 2 mass % and the ratio of the mass % proportion of copper to the mass % of nickel is between 0.6 and 1.5.

Clearly, the aluminum alloy in accordance with the invention is a technical alloy and can contain impurities of up to a maximum of 0.2 mass % per element. A total amount of impurity additives of up to 1 mass % is possible within the purview of the invention.

The invention proposes the addition of copper and nickel to the aluminum alloy in such quantities as to induce formation of inter-metallic phases containing nickel and copper, e.g. the inter-metallic phase $Al_3$ (Ni,Cu). Therefore, copper and nickel are preferably added in approximately equal proportions. The above mentioned ratio between the copper and nickel proportions is therefore preferably between 0.8 and 1.2.

It has turned out that nickel forms a stationary inter-metallic phase of high ten side strength as annealed, in contrast to inter-metallic aluminide phases, such as $Al_2Cu$, containing exclusively copper, which act in a certain sense as a copper sink. This prevents the copper from migrating within the matrix during heat treatment and causes coarsening of the precipitate phases (referred to as Ostwald curing). Such coarsening is undesirable, since the coarse precipitates constitute potential fatigue or crack forming locations within the alloy which impair the plasticity and reduce the stability under load. Particularly $Al_2Cu$ precipitates tend to coarsen due to the relatively high volubility of the copper in the mixed aluminum crystal.

The inventive alloy AlSn12Cu1Ni achieves high matrix hardness and very good plasticity. The alloy material has good rolling properties even with large pass reductions of more than 50% due to the interaction between the copper and nickel. High matrix contents of copper produce high matrix hardness (mixed crystal hardening). Heat treatment per se tends to form coarse or coarsening hard phases, e.g. $Al_2Cu$ which have negative effects on the plasticity and fatigue resistance. By adding nickel, formation of coarse aluminum copper phases is prevented or at least considerably reduced since nickel copper aluminide is preferably formed which has only little tendency to coarsening. The nickel copper aluminides are present in a finely distributed form even after heat treatment up to 250 degrees in contrast to pure copper aluminides due to the extremely low solubility of nickel in the mixed aluminum crystal.

The essential effect of the claimed nickel content in dependence on the copper content is to bind copper in the form of nickel copper aluminide to thereby suppress or reduce formation of $Al_2Cu$ precipitates. These $Al_2Cu$ precipitates have particularly negative effects on the plasticity since, in contrast to the thermally stable nickel copper aluminides, they coarsen during heat treatment and thereby present a potential source for cracks. A portion of the copper is present in the matrix in the desired, finely distributed form.

We claim:

1. A sliding bearing composite material comprising a hard metal support layer and a metal sliding layer, roll-bonded onto the support layer, the sliding layer made from an aluminum alloy and being in direct con tact with the sliding partner, the Aluminum alloy consisting of:

10 to 25 mass % tin, copper, nickel, the balance being aluminum, with a total impurity content of at most 1 mass % and of at most 0.2 mass % per impurity element, wherein copper and nickel each comprise a portion of 0.2 to 2 mass % and wherein a ratio of a mass % portion of copper to a mass % portion of nickel is between 0.8 and 1.2 to form an inter-metallic phase $Al_3$(Ni, Cu) of hard substance precipitates.

2. The sliding bearing composite material of claim 1, wherein both copper and nickel each constitute a proportion of 0.7 to 1.3 mass %.

3. The sliding bearing composite material of claim 1, wherein a proportion of tin is between 10 and 20 mass %.

4. The sliding bearing composite material of claim 3, wherein said proportion of tin is between 10 and 15 mass %.

5. The sliding bearing composite material of claim 1, wherein the sliding layer has a thickness of at least 0.2 mm.

6. The sliding bearing composite material of claim 5, wherein the sliding layer has a thickness between 0.2 mm and 0.6 mm and the support layer has a thickness of between 0.3 mm and 0.6 mm.

\* \* \* \* \*